(12) United States Patent
Eisenbach (10) Patent No.: US 7,463,861 B2
(45) Date of Patent: Dec. 9, 2008

(54) AUTOMATIC DATA ENCRYPTION AND ACCESS CONTROL BASED ON BLUETOOTH DEVICE PROXIMITY

(75) Inventor: Andre Eisenbach, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 607 days.

(21) Appl. No.: 11/074,271

(22) Filed: Mar. 7, 2005

(65) Prior Publication Data
US 2006/0199538 A1   Sep. 7, 2006

(51) Int. Cl.
*H04B 7/00* (2006.01)
(52) U.S. Cl. .................. 455/41.2; 455/410; 455/411; 380/270; 380/247; 380/255; 380/277
(58) Field of Classification Search ............. 455/41.2, 455/410, 411; 380/201, 247, 268, 270, 255, 380/277, 278
See application file for complete search history.

(56) References Cited

U.S. PATENT DOCUMENTS

| | | | |
|---|---|---|---|
| 6,088,450 A | | 7/2000 | Davis et al. |
| 6,092,201 A | | 7/2000 | Turnbull et al. |
| 6,772,331 B1 | * | 8/2004 | Hind et al. ............ 713/151 |
| 2003/0199267 A1 | | 10/2003 | Naoki et al. |
| 2004/0014423 A1 | * | 1/2004 | Croome et al. ........... 455/41.2 |
| 2004/0029563 A1 | | 2/2004 | Berg |
| 2004/0123106 A1 | | 6/2004 | D'Angelo et al. |
| 2004/0143750 A1 | * | 7/2004 | Kulack et al. ............ 713/200 |
| 2005/0105734 A1 | * | 5/2005 | Buer et al. ............ 380/270 |
| 2006/0041760 A1 | * | 2/2006 | Huang ................ 713/189 |

OTHER PUBLICATIONS

Specification of the Bluetooth System, Version 1.2, Nov. 5, 2003, pp. 1-1200.

* cited by examiner

*Primary Examiner*—Tuan A Pham
(74) *Attorney, Agent, or Firm*—McAndrews, Held & Malloy, Ltd.

(57) ABSTRACT

A method, apparatus, and system for using Bluetooth devices to secure sensitive data on other Bluetooth devices is described. A Bluetooth device is paired with a "trusted" Bluetooth device. When contact with the trusted device is lost, designated sensitive data on the secured Bluetooth device is automatically encrypted. When contact is restored, the data is automatically decrypted. In an alternate embodiment, a secured device can be associated with multiple trusted devices, and the secured device designate different sensitive data for each trusted device. In this way, multiple users can share a common, "public" Bluetooth device without concern that the other users will access their sensitive data on the device when the device is not being used by that user.

13 Claims, 4 Drawing Sheets

AUTOMATIC DATA ENCRYPTION AND ACCESS CONTROL BASED ON BLUETOOTH DEVICE PROXIMITY

CROSS-REFERENCE TO RELATED APPLICATIONS/INCORPORATION BY REFERENCE

Two other applications, by the same inventor and assigned to a common assignee, have been filed on the same date that contain similar disclosure in the area of Bluetooth devices. They are attorney docket numbers 16062US01, Ser. No. 11/073,801 and 16064US01, Ser. No. 11/073,647.

FIELD OF THE INVENTION

Certain embodiments of the invention relate to wireless security. Certain embodiments of the invention relate to a method and system for securing Bluetooth® devices. Aspects of the invention are especially adapted for use in a system that encrypts sensitive data on a Bluetooth device when a device is no longer in the proximity of another "trusted" Bluetooth device.

BACKGROUND OF THE INVENTION

More and more personal data is being stored on ever smaller and more mobile devices. The risk that sensitive data regarding identity, access codes, or business information could be compromised if one of these devices is mislaid increases with the amount of information that can be stored on them and their increasingly pervasive use. Requiring the entry of security codes or keys is a partial solution, but the efficacy of this solution decreases to the extent that the device is left "unlocked" or the security feature to utilize the feature is disabled because it is inconvenient.

Further limitations and disadvantages of conventional and traditional approaches to securing personal computing devices will become apparent to one of skill in the art, through comparison of such systems with some aspects of the present invention as set forth in the remainder of the present application with reference to the drawings.

BRIEF SUMMARY OF THE INVENTION

Aspects of the invention may be found in a method and system for securing data stored on a Bluetooth® device, for example, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for detecting the proximity of Bluetooth devices. Certain embodiments of the invention may be found in a method and system for locating proximate Bluetooth® devices and exchanging encryption keys. Additional embodiments encrypt data when a trusted device is no longer present, or lock the device.

Bluetooth wireless technology is set to revolutionize personal connectivity by providing freedom from wired connections. Bluetooth is a specification for a small form-factor, low-cost radio solution providing links between mobile computers, mobile phones and other portable and handheld devices. Of particular interest is Bluetooth's low power consumption and short range, coupled with the ability of Bluetooth devices to automatically detect and attach to other Bluetooth devices that are close by, typically within 10 meters or less.

About Bluetooth

Bluetooth wireless technology is an international, open standard for allowing intelligent devices to communicate with each other through wireless, short-range communications. This technology allows any sort of electronic equipment—from computers and cell phones to keyboards and headphones—to make its own connections, without wires, cables or any direct action from a user. Bluetooth is currently incorporated into numerous commercial products including laptops, PDAs, cell phones, and printers, with more products coming out every day.

How Bluetooth Works

Figure 1:
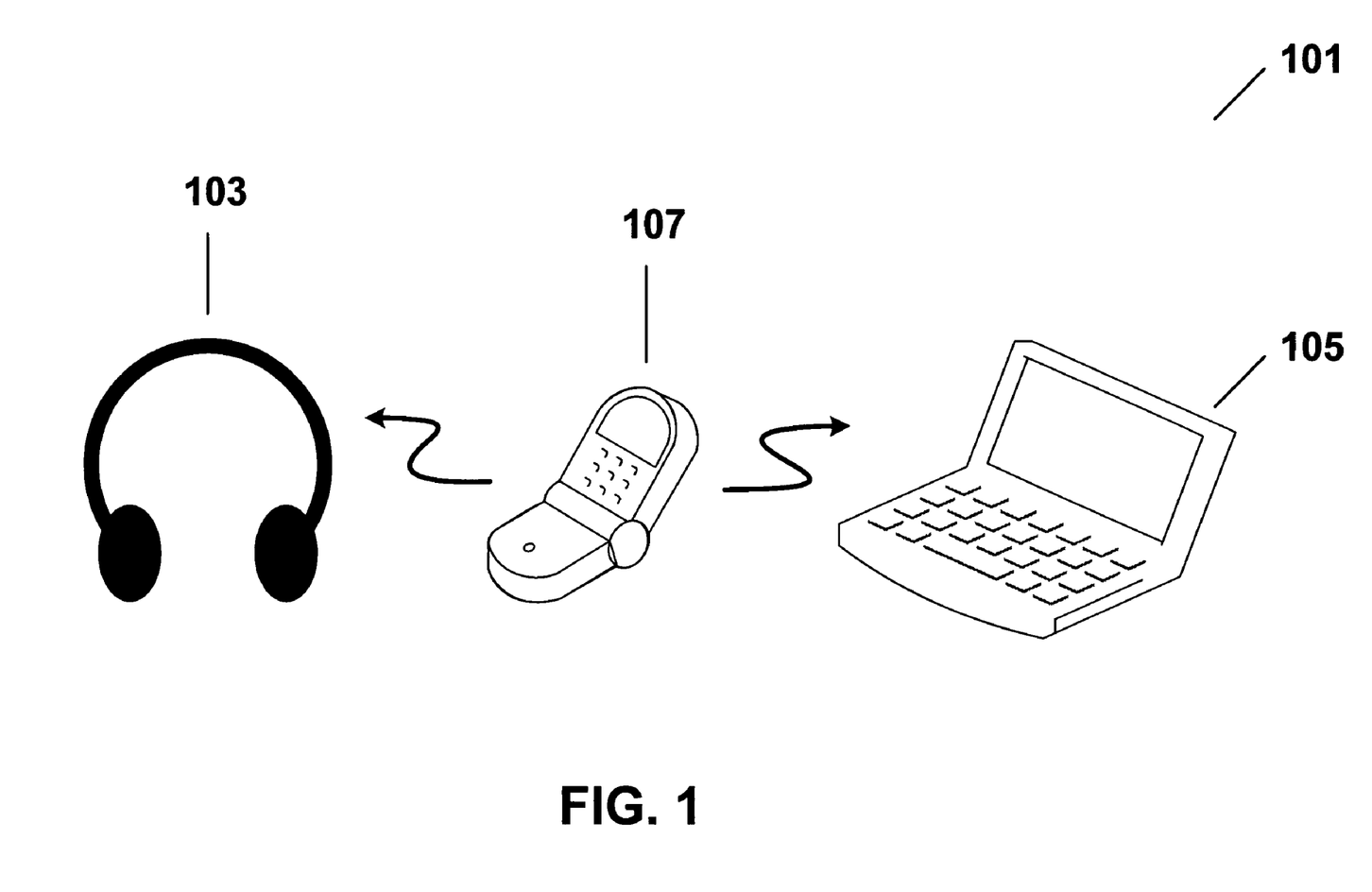
FIG. 1 is a diagram illustrating a basic Bluetooth® (BT) piconet.

Bluetooth is a frequency hopping spread spectrum (FHSS) radio system operating in the 2.4 GHz unlicensed band. Its low power transmissions allow a typical range of about 10 meters. Devices connect to each other to form a network known as a piconet, with up to seven active devices in the piconet. FIG. 1 shows a piconet 101 that includes three Bluetooth enabled devices: a headset 103, a laptop computer 105, and a cellular phone 107. The maximum data throughput between devices is approximately 723 kbps with the data capacity shared between devices on the piconet.

Figure 2:
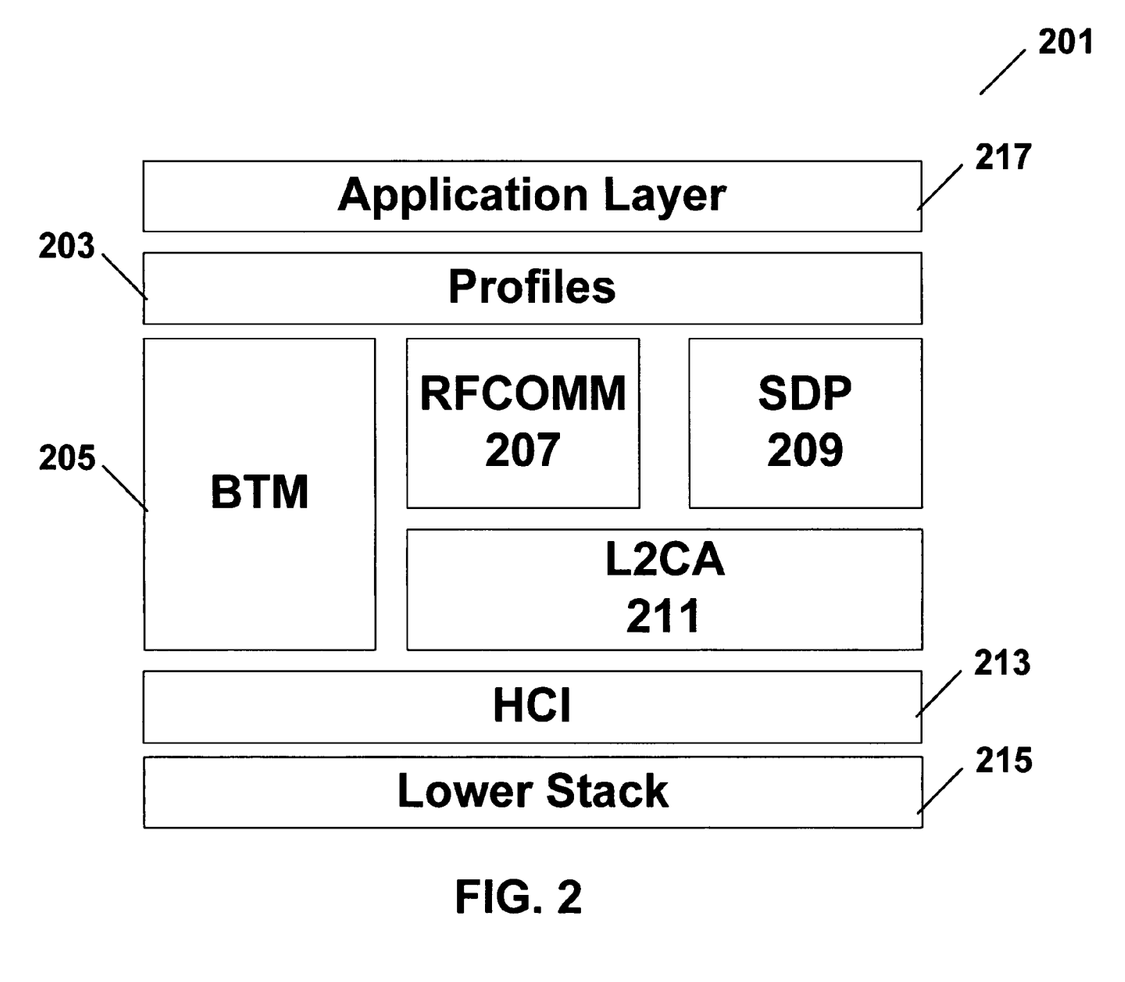
FIG. 2 is a simplified exemplary protocol stack.

Bluetooth has a protocol stack to transfer data and implement the advanced features required by applications. The protocol stack consists of several different protocols designed for different purposes. The profiles, or applications, reside above the protocol stack. Bluetooth also has a lower protocol stack for link management and baseband control. FIG. 2 is a simplified exemplary protocol stack 201. The stack includes Profiles 203, a BTM 205, RFCOMM 207, SDP 209, L2CAP 211, HCI 213, and Lower Stack 215. The application layer 217 contains the computer programs that actually implement useful tools that take advantage of the Bluetooth functionality.

Figure 3:
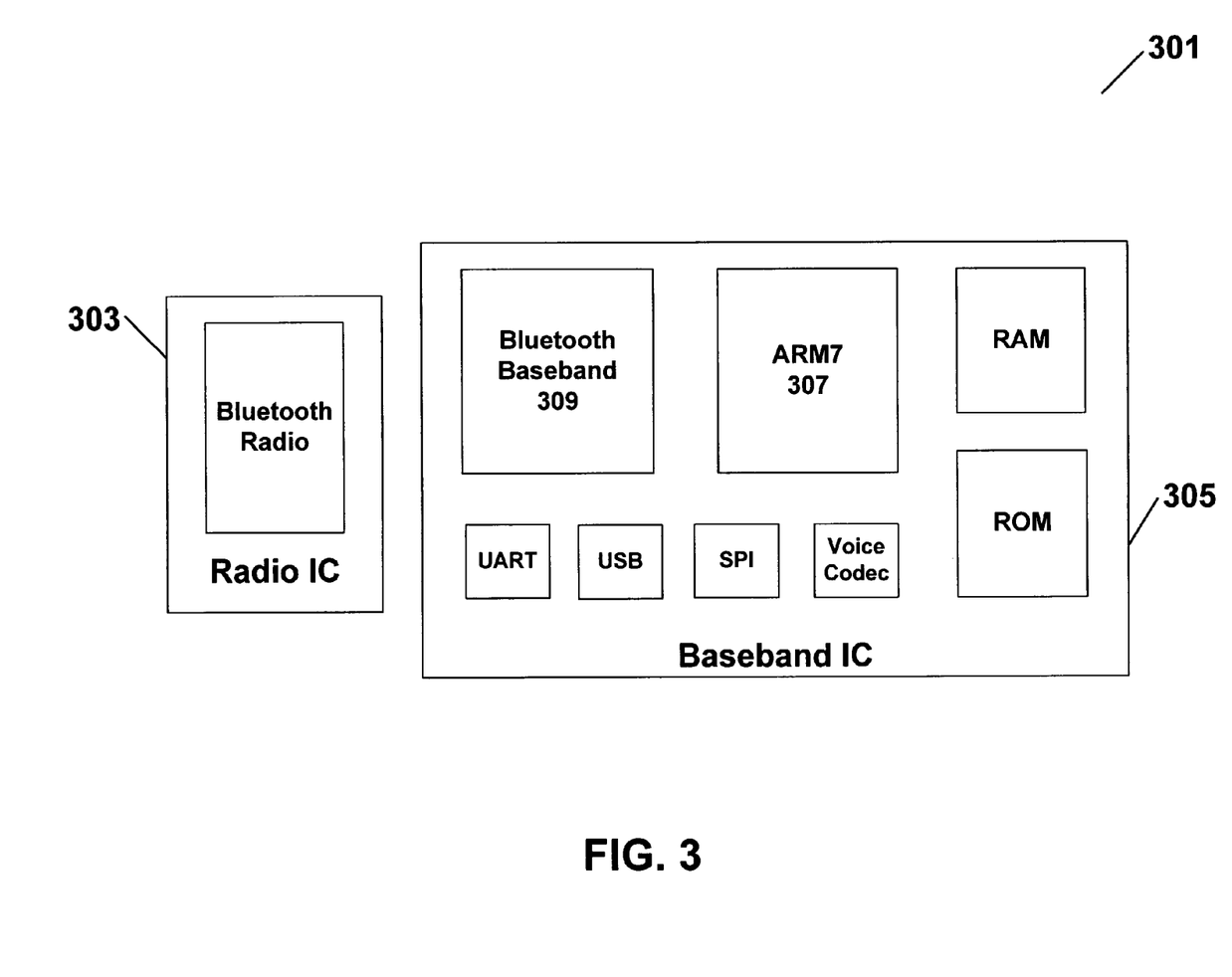
FIG. 3 is a block diagram illustrating an exemplary Bluetooth® hardware implementation, that runs the protocol stack of FIG. 2, for example, in accordance with an exemplary embodiment of the present invention.

Bluetooth hardware implementations are typically highly integrated systems consisting of one or two chips. FIG. 3 is a block diagram illustrating an exemplary Bluetooth® hardware implementation, which includes a Radio IC 303 and a Baseband IC 305.

The Bluetooth baseband chip consists of a processor core such as an ARM7 with integrated memories 307, Bluetooth baseband 309, and several other peripherals. The radio is implemented in a separate chip 303. The ARM7 processor runs all the required software including a lower stack, an upper stack, and an embedded profile. This type of single CPU implementation allows for a small, low power, low cost solution.

The software "stack" contemplates the insertion of useful applications in the higher layers of the stack. These applications can be designed to take advantage of Bluetooth's lower layers to implement functionality based on Bluetooth radio links.

The short range nature of Bluetooth wireless networking allows it to be used for device proximity detection. Based on the presence or absence of devices, sensitive data on handheld devices or desktop computers can be encrypted on the fly without any user intervention. Sensitive data is encrypted/decrypted based on the proximity or not of "trusted" Bluetooth enabled devices. A trust relationship is established by exchanging Bluetooth link keys using the device pairing procedure and explicitly marking the device as trusted. Once such a relationship is established, sensitive data is automatically encrypted and decrypted based on the availability of trusted devices. Trusted devices could include cellular phones, desktop computers, laptop computers or specialty devices like Bluetooth key-chains. A device performs regular Bluetooth scans to detect trusted devices in the area. If no device is detected, all data in a file area marked as sensitive will be automatically encrypted after a timeout expires. Once a trusted device enters proximity, the data is automatically decrypted and ready to be viewed/edited by the user. Optionally, the device may also be locked for access when no trusted device is found.

A method in accordance with the present invention may be extended to desktop devices that are Bluetooth enabled. Again, certain file areas may be marked as sensitive. The Bluetooth software performs regular scans for trusted personal devices like cellular phones, PDAs or Bluetooth key chains. If no trusted device is found, sensitive data is encrypted on the fly and the screen may optionally be locked for the user. This allows a user to walk away from his desk and have the desktop lock itself automatically until he or she returns.

Aspects of the invention may be substantially integrated onto an integrated circuit or chip, for example a Bluetooth chip. The chip may have machine-readable storage having stored thereon, a computer program having a code section for detecting the presence of other Bluetooth devices. The program may include at least one code section being executable by a machine for causing the machine to perform steps comprising those substantially as shown and described below.

An integrated circuit of the invention may also include an application layer that performs methods in accordance with aspects of the invention. The integrated circuit is desirably connected to a Bluetooth radio. The integrated circuit may also have a unique hardware ID.

Bluetooth standards specify a "pairing" procedure that allows one device to associate itself with another. Pairing is described in detail in the Bluetooth 1.2 core specification, Vol. 3, Section 3.3.

In an exemplary embodiment, the system utilizes at least two devices. Initially, the devices are not "paired." Once the devices are brought into proximity with each other, the owner can allow them to associate with each other. Once paired, a method in accordance with the invention can be employed to mark the paired device as a trusted device. Each device will then recognize the other device as "trusted." Once this association is made, software in each device is used to lock the device or encrypt designated files whenever the "trusted" device is detected as not being present. Any Bluetooth device can be both a trusted and/or secured device. For example, cell phone 107 could be the trusted device for secured device laptop 105. Headset 103 could be the trusted device for secured device cell phone 107.

Figure 4:
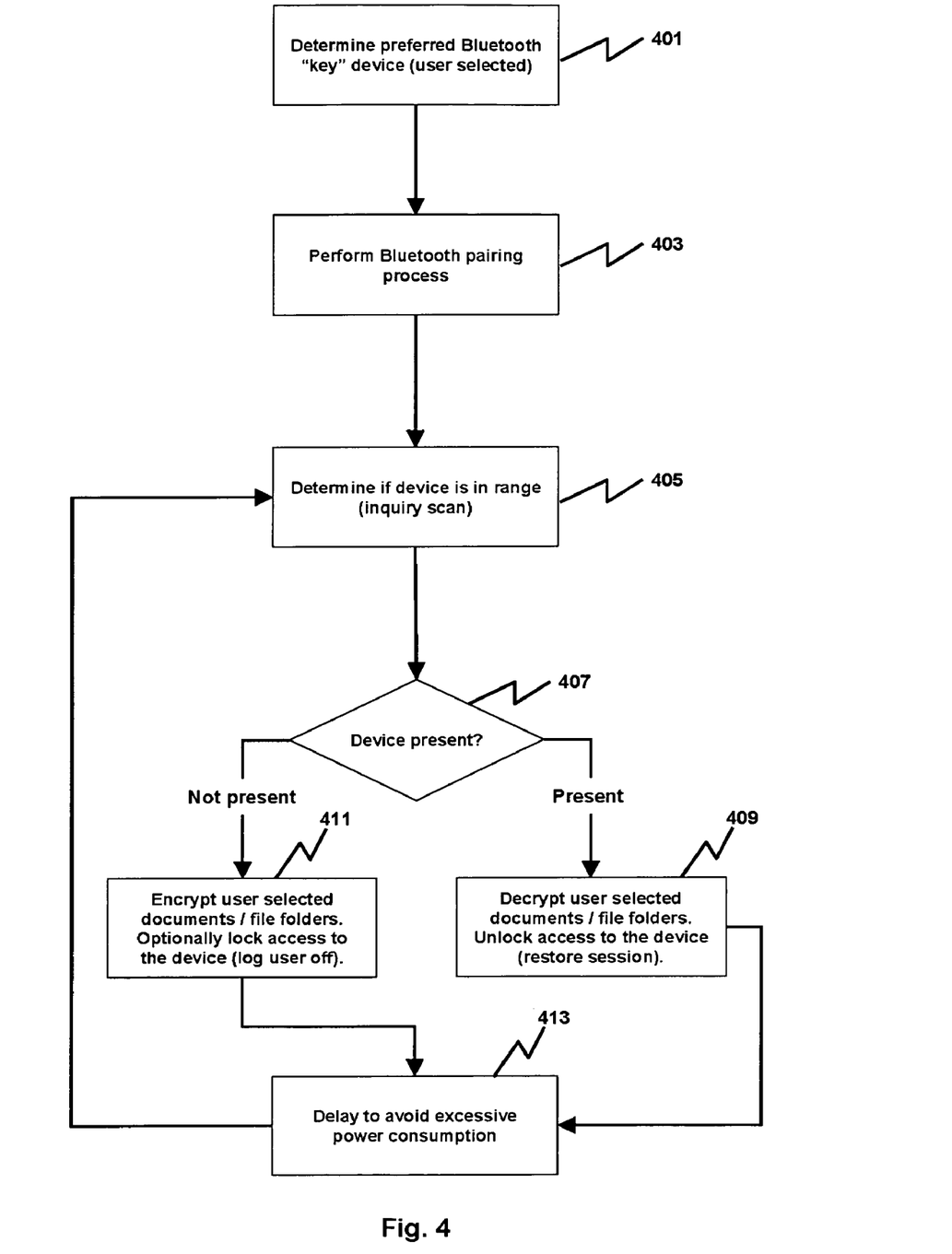
FIG. 4 is a flowchart showing one method of the invention for a secured device as a trusted Bluetooth device enters and leaves the presence of the secured device in accordance with an exemplary embodiment of the present invention.

The logical flow of one method of the invention is described in connection with FIG. 4, which shows exemplary steps of the invention in flowchart form, from the perspective of a secured device. First, the user selects a preferred "Bluetooth" key or trusted device in step 401. Next, the secured device is paired with the trusted device in step 403. At intervals selected for power consumption and security, a determination of whether or not the trusted device is still in range is made using a Bluetooth inquiry scan in step 405. Step 407 determines whether or not the trusted device is present based on the result of the inquiry scan. If the trusted device is present, then the sensitive areas selected for this particular trusted device are decrypted, and optionally the secured device is unlocked in step 409. If the trusted device is not present, the program branches to step 411, where the sensitive areas are encrypted and the device is optionally locked. Step 413 is a delay timer to prevent excessive power consumption from too frequent inquiry scans followed by encryption/decryption cycles, which could happen if the trusted device is at the communication margin for establishing contact with the secured device. Control then returns to step 405.

It should be appreciated that one of the advantages of this or other methods in accordance with the invention is that a secured device need not be totally disabled when the trusted device is absent. Thus, cellphone 107 may still be used without headset 103, however the person to whom cellphone 107 is lent cannot, without the headset, access, for example the personal phone book of the owner of cellphone 107 even though they may borrow the phone to make a call.

The following code illustrates an example of a software program that implements one or more embodiments of the invention in a Bluetooth enabled device. The following code encrypts a sensitive memo based on the proximity or not of a trusted Bluetooth device:

```
// BlueMemoCEDlg.cpp : implementation file
//
#include "stdafx.h"
#include "BlueMemoCE.h"
#include "BlueMemoCEDlg.h"
#ifdef _DEBUG
#define new DEBUG_NEW
#undef THIS_FILE
static char THIS_FILE[] = __FILE__;
#endif
#define TIMER_SCAN 4711
HWND gm_hDialog;
///////////////////////////////////////////////////////////////////////////
```

-continued

```
// CBlueMemoCEDlg dialog
CBlueMemoCEDlg::CBlueMemoCEDlg(CWnd* pParent /*=NULL*/)
        : CDialog(CBlueMemoCEDlg::IDD, pParent)
{
        //{{AFX_DATA_INIT(CBlueMemoCEDlg)
        //}}AFX_DATA_INIT
        m_hIcon = AfxGetApp( )->LoadIcon(IDR_MAINFRAME);
        m_pWBtAPI = NULL;
        m_bDeviceFound = FALSE;
        m_bMemoEncrypted = FALSE;
}
CBlueMemoCEDlg::~CBlueMemoCEDlg( )
{
        delete m_pWBtAPI;
        m_pWBtAPI = NULL;
}
void CBlueMemoCEDlg::DoDataExchange(CDataExchange* pDX)
{
        CDialog::DoDataExchange(pDX);
        //{{AFX_DATA_MAP(CBlueMemoCEDlg)
        DDX_Control(pDX, IDC_MEMO, m_cMemo);
        //}}AFX_DATA_MAP
}
BEGIN_MESSAGE_MAP(CBlueMemoCEDlg, CDialog)
        //{{AFX_MSG_MAP(CBlueMemoCEDlg)
        ON_WM_TIMER( )
    ON_REGISTERED_MESSAGE(WIDCOMM_WM_DISCOVERYEVENT, OnDiscoveryEventMsg)
    ON_REGISTERED_MESSAGE(WIDCOMM_WM_DEVICELOST, OnDeviceLost)
        //}}AFX_MSG_MAP
END_MESSAGE_MAP( )
////////////////////////////////////////////////////////////////////////////
// CBlueMemoCEDlg message handlers
BOOL CBlueMemoCEDlg::OnInitDialog( )
{
        CDialog::OnInitDialog( );
        SetIcon(m_hIcon, TRUE);                 // Set big icon
        SetIcon(m_hIcon, FALSE);                // Set small icon
        CenterWindow(GetDesktopWindow( ));      // center to the hpc screen
        gm_hDialog = this->GetSafeHwnd( );
        m_bDeviceFound = TRUE;
        SetMemoState( );
        SetTimer( TIMER_SCAN, 50, NULL );
        return TRUE;
}
void CBlueMemoCEDlg::OnTimer(UINT nIDEvent)
{
        switch ( nIDEvent )
        {
        case TIMER_SCAN:
            ScanForDevice( );
            break;
        default:
            break;
        }
        CDialog::OnTimer(nIDEvent);
}
BOOL CBlueMemoCEDlg::InitBluetooth( )
{
        BOOL bRet = TRUE;
        if ( NULL == m_pWBtAPI )
        {
            WBtRc rc = WBT_ERROR;
            m_pWBtAPI = new CWBtAPI;
            rc = m_pWBtAPI->ConnectToServer( );
            bRet = (rc == WBT_SUCCESS);
            if ( bRet )
            {
                m_pWBtAPI->SetOnDiscoveryEventCallback( cbDiscoveryEvent, this );
                m_pWBtAPI->SetOnDeviceLostCallback( cbDeviceLost, this );
            }
        }
        return bRet;
}
void CBlueMemoCEDlg::ScanForDevice( )
{
        KillTimer( TIMER_SCAN );
        if ( !InitBluetooth( ) )
        {
```

```
                m_bDeviceFound = FALSE;
                SetMemoState( );
                SetTimer( TIMER_SCAN, 3000, NULL );
                return;
        }
    // Hard coded device address for now. This should be
    // selected from the paired devices list by the user.
        BD_ADDR bda = { 0x00, 0x0A, 0xD9, 0x5D, 0x26, 0x45 };
        GUID        guid;
        static const GUID   sBTBaseGUID = {0, 0, 0x1000, 0x80, 0x00, 0x00, 0x80,
0x5F, 0x9B, 0x34, 0xFB};
        memcpy (&guid, &sBTBaseGUID, sizeof (GUID));
        guid.Data1 = 0x1101;
        WBtRc rc = m_pWBtAPI->GapStartServiceDiscovery( bda, guid, TRUE );
        if ( rc != WBT_SUCCESS )
        {
            AfxMessageBox(_T("Unable to start service discovery!"));
        }
}
void CBlueMemoCEDlg::cbDiscoveryEvent( void *pUserData, BD_ADDR bda, UINT16
nRecs, long lResultCode )
{
    class CDiscoveryEventPackage *pPackage = new CDiscoveryEventPackage;
    pPackage->m_pItemData = pUserData;
    memcpy(pPackage->m_bda, bda, sizeof(BD_ADDR));
    pPackage->m_nRecs             = nRecs;
    pPackage->m_lReturnCode       = lResultCode;
    ::PostMessage( gm_hDialog, WIDCOMM_WM_DISCOVERYEVENT, 0, (LPARAM)pPackage
);
}
void CBlueMemoCEDlg::cbDeviceLost( void *pUserData, BD_ADDR bda )
{
    BD_ADDR dev_bda = { 0x00, 0x0A, 0xD9, 0x5D, 0x26, 0x45 };
    ::PostMessage( gm_hDialog, WIDCOMM_WM_DEVICELOST,  0, 0 );
}
LRESULT CBlueMemoCEDlg::OnDiscoveryEventMsg( WPARAM wParam, LPARAM lParam )
{
    CDiscoveryEventPackage *pPackage = (CDiscoveryEventPackage *)lParam;
    if ( pPackage && pPackage->m_nRecs )
    {
            m_bDeviceFound = TRUE;
        } else {
            m_bDeviceFound = FALSE;
          SetTimer( TIMER_SCAN, 3000, NULL );
        }
        SetMemoState( );
        return 0;
}
LRESULT CBlueMemoCEDlg::OnDeviceLost( WPARAM wParam, LPARAM lParam )
{
    SetTimer( TIMER_SCAN, 3000, NULL);
    SetMemoState( );
    return 0;
}
inline BYTE GetHexDigit(TCHAR c)
{
    return (_istalpha(c)) ? (10 + toupper(c) - _T('A')) : (c - _T('0'));
}
void CBlueMemoCEDlg::SetMemoState( )
{
        CString szMemo;
        m_cMemo.GetWindowText( szMemo );
        if ( szMemo.GetLength( ) == 0 )
        {
            szMemo = _T("Top secret memo! Top secret memo! Top secret memo!
Top secret memo! Top secret memo!");
            m_cMemo.SetWindowText( szMemo );
        }
        if( m_bDeviceFound && m_bMemoEncrypted )
        {
            Decrypt( );
            m_bMemoEncrypted = FALSE;
        }
        if( !m_bDeviceFound && !m_bMemoEncrypted )
        {
            Encrypt( );
            m_bMemoEncrypted = TRUE;
        }
}
```

-continued

```
void CBlueMemoCEDlg::Encrypt( )
{
        CString szMemo;
    m_cMemo.GetWindowText( szMemo );
    if ( szMemo.GetLength( ) > 0 )
    {
            INT i, j;
            CString szHex = _T(""), szTmp = _T("");
            TCHAR szBuffer[ 10 ];
            m_cMemo.EnableWindow( FALSE );
            for( i=0; i<szMemo.GetLength( ); i++ )
            {
                TCHAR tch = (TCHAR)szMemo[i];
                CHAR *ch = (char*) &tch;
                for( j=0; j<sizeof( TCHAR ); j++ )
                {
                    ZeroMemory( szBuffer, sizeof( szBuffer ));
                    _stprintf( szBuffer, _T("%02X"), ch[j] );
                    szHex += szBuffer;
                }
                szTmp = szHex + szMemo.Right( szMemo.GetLength( ) - i - 1);
            }
            m_cMemo.SetWindowText( szTmp );
    }
}
void CBlueMemoCEDlg::Decrypt( )
{
        CString szMemo;
        m_cMemo.GetWindowText( szMemo );
        if ( szMemo.GetLength( ) > 0 )
        {
            INT i=0, j=0;
            CString szPlain = _T(""), szTmp = _T ("");
            m_cMemo.EnableWindow( TRUE );
            i = szMemo.GetLength( );
            while( i )
            {
                TCHAR tch;
                CHAR *ch = (char*)&tch;
                INT k = i-4;
                for ( j=0; j<sizeof(TCHAR); j++ )
                {
                    ch[ j ] = GetHexDigit( szMemo[k++] ) * 16 +
GetHexDigit( szMemo [k++] );
                }
                i -= sizeof( TCHAR ) * 2;
                szPlain = tch + szPlain;
                szTmp = szMemo.Left( i ) + szPlain;
            }
            m_cMemo.SetWindowText( szTmp );
    }
}
```

In an alternate embodiment, the Bluetooth enabled device does not implement the encryption algorithm on the sensitive data until the expiration of a timer.

Note that any combination of trusted and secured devices is possible. For example, several user owned devices containing sensitive data can be paired with a single "trusted" device. The trusted device can take the form of a "key fob" or other small personal item dedicated to the function of providing a trusted Bluetooth device for the users entire set of Bluetooth enabled devices. Thus, a single person's sensitive data is proximity keyed to a single device and is not accessible to others. In another variation, it is possible for a single secured device to be paired with multiple "trusted" devices. Because each trusted device can be associated with different sensitive data, this allows multiple users, even strangers, to share a common computer containing data that is sensitive to each of them without concern that the other user will read the private data. This allows, for example, multiple drivers to share a "pooled" vehicle containing integrated phone and GPS services where each driver has private address information stored on the car's computer. It also allows hospitals to encrypt private medical data generally, but allow medical technicians to access the private data when, e.g., the patient is in the same room as the terminal or has provided his or her "key" to the medical staff.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A security method, comprising:
   a. pairing two Bluetooth devices,
   b. designating at least one of said paired Bluetooth devices as a trusted device for the other, a secured device;
   c. designating at least a portion of the data storage on said secured device as sensitive data;
   d. detecting when said trusted device is no longer in proximity with said secured device;
   e. encrypting said sensitive data when said trusted device is no longer in proximity with said secured device; and
   f. de-encrypting said sensitive data when said trusted device is detected as being in proximity with said secured device.

2. The method of claim 1 wherein the method further comprises encrypting said sensitive data after a timer has expired.

3. The method of claim 1 wherein said secured device is locked when said trusted device is no longer in proximity with said trusted device.

4. The method of claim 1 wherein said secured device is paired with more than one trusted device.

5. The method of claim 1 wherein the secured device is also a trusted device.

6. The method of claim 1 wherein the trusted device is also a secured device.

7. The method of claim 1 wherein the secured device designates different sensitive data for each of a plurality of trusted devices.

8. An integrated circuit, said integrated circuit including an application layer that performs the method comprising:
   a. pairing two Bluetooth devices,
   b. designating at least one of said paired Bluetooth devices as a trusted device for the other, a secured device;
   c. designating at least a portion of the data storage on said secured device as sensitive data;
   d. detecting when said trusted device is no longer in proximity with said secured device;
   e. encrypting said sensitive data when said trusted device is no longer in proximity with said secured device; and
   f. de-encrypting said sensitive data when said trusted device is detected as being in proximity with said secured device.

9. The integrated circuit of claim 8, further delaying the encrypting of sensitive data until the expiration of a timer.

10. The integrated circuit of claim 8, wherein said integrated circuit is incorporated into a dedicated security fob.

11. The integrated circuit of claim 8, wherein said integrated circuit is paired with additional said trusted devices.

12. The integrated circuit of claim 11, wherein said integrated circuit designates different sensitive data for each of said trusted devices.

13. The integrated circuit of claim 8, wherein said integrated circuit is also designated as a trusted device.

* * * * *